United States Patent Office 3,682,864
Patented Aug. 8, 1972

3,682,864
METHOD FOR THE PRODUCTION OF POLY-ESTERS, MORE PARTICULARLY LINEAR POLYALKYLENE TEREPHTHALATES, AND CATALYST EMPLOYED THEREFOR
Francesco Siclari and Edgardo Horak, Barlassina, and Mario Rosso, Milan, Italy, assignors to SNIA Viscosa Società Nazionale Industria Applicazioni Viscosa S.p.A., Milan, Italy, and Kanegafuchi Boseki Kabushiki Kaisha, Tokyo, Japan
No Drawing. Filed Mar. 16, 1970, Ser. No. 20,060
Claims priority, application Italy, Apr. 4, 1969, 15,136/69
Int. Cl. C08g 17/015
U.S. Cl. 260—75 R    3 Claims

ABSTRACT OF THE DISCLOSURE

A method for the production of polyesters, more particularly linear polyalkylene terephthalates is disclosed, wherein the polycondensation step is carried out by using as a catalyst an association of elemental antimony with insoluble titanium compounds. Titanium hydride, carbide, nitride, boride or phosphide are the preferred titanium compounds. In addition to accelerating the polycondensation reaction, the catalyst system of this invention has no detrimental effect on the whiteness rating of the finished polymers.

---

This invention relates to a method for the production of polyesters, more particularly linear polyalkylene terephthalates.

It is known that in the production of such polyesters, more particularly of polyalkylene terephthalates which are adapted to be converted into important industrial products, such as fibres, films, tapes and the like, it is a common practice to use, both in the esterification or re-esterification stage, as well as in the polycondensation stage, suitable catalysts so as to speed up the process run.

As is known, in the esterification stage a bicarboxylic acid is caused to react with a glycol (generally a glycol of the HO—$(CH_2)_n$—OH series) wherein $n$ is an integer from 2 to 10, in order to obtain an intermediate monomeric ester. Preferably, terephthalic acid is reacted with ethylene glycol, the bis(2-hydroxyethyl)terephthalate being obtained as an intermediate monomer, the latter being subsequently polycondensed so as to obtain the expected linear polyester. When, conversely, re-esterification is adopted as the initial stage, a low molecular weight ester of the bicarboxylic acid is reacted with a glycol of the kind mentioned above, preferably dimethyl terephthalate with ethylene glycol, the intermediate monomer being likewise obtained, which is then polycondensed.

Among the re-esterification catalysts there have been suggested, inter alia, organic salts of zinc, manganese, calcium or other metals. Also, when direct esterification is carried out between the terephthalic acid and a glycol, it is common practice to use, for example, trivalent or bivalent salts as catalysts. As polycondensation catalysts, it is known that there may be used elemental antimony in various forms and sizes, compounds of elemental antimony and a few titanium compounds, which are generally soluble in the reaction mass.

It is known, however, that the titanium compounds as suggested heretofore as catalysts, for example organic titanates, even though they satisfactorily accelerate the polycondensation reactions, impart to the produced polymer undesirable yellow discolorations, which are such as to prejudice its subsequent use in the manufacture of commercial products for which transparency or whiteness are a requirement, such as, as is well known, the textile fibres.

It has been thought that, in general, the conventional methods do not allow the obtention of those reaction conditions which would be the most desirable ones for carrying out the method within the shortest possible time, while concurrently achieving a polymer having a satisfactory clear color and which is adapted to be converted, more particularly, into fibres and yarns having the most satisfactory mechanical and textile properties.

According to the invention, novel catalysts have been found which possess a high catalytic action on polycondensation as used in the production of polyesters, and which do not originate the shortcomings and disadvantages listed above.

The method according to the invention, for the production of polyesters, more particularly of linear polyalkylene terephthalates, is characterized in that titanium compounds, which are substantially insoluble in the reaction environment are used, in association with elemental antimony, as catalysts for the polycondensation stage.

It has been further ascertained that, in said catalyst association, the presence of even slight amounts of the insoluble titanium compound with respect to the amount of elemental antimony which is present, unpredictably display an intensive synergistic action on the catalytic activity of antimony, so that the time taken by polycondensation becomes remarkably shortened over the time required when elemental antimony alone is used. It has been ascertained that, under the most desirable working conditions, such as will become apparent in the examples, the enhancement of the catalytic activity of the novel catalyst over the activity of antimony alone, can attain even 20–25%. In a few cases, when the association of the titanium compound with antimony is prepared according to a "nucleation" procedure, as will be explained hereinafter, an increase of the catalytic activity as high as 25–30%, approx., can be obtained.

The practical use of the inventive catalyst has also shown considerable advantages as regards the polymer color. As a matter of fact, the polymer produced according to the invention has a satisfactorily clear color, as contrasted with a more or less intense yellow hue such as is seen when a technically conventional catalyst, based on a soluble titanium compound, is used.

According to the invention, it has been ascertained that the insoluble titanium compound displays its favourable synergistic action when it is present in the catalytic association in amounts (calculated in terms of titanium gram-atoms) ranging between 1 and 45 percent, preferably between 5 and 30 percent, with respect to the catalyst (calculated in gram-atoms of antimony plus titanium).

The amount of the inventive catalyst which has proven to be favourable in the use for the preparation of linear polyesters, ranges from: 40 to 800 parts per million (p.p.m.) by weight of metal (titanium plus antimony) with respect to the polymer intended to be produced, and preferably from 100 to 600 p.p.m.

More particularly the use of a few insoluble titanium compounds such as hydride, carbide, nitride and boride, phosphide and silicide has proven to be extremely favourable, in combination with elemental antimony as outlined above. In these insoluble compounds, titanium shows a bond of metallic type with respect to the other element.

Preferably, the insoluble titanium compounds are used in the form of fine particles hving a size of less than 10 microns.

Conversely, the elemental antimony is preferably used as a finely divided powder having a size of less than 20 microns.

According to the invention, the preferred titanium compound is titanium hydride.

The introduction of the inventive catalyst can take place at the beginning of the polycondensation stage, or, as a preferable alternative, at the beginning of, or during, the re-esterification or esterification stage, according to the well known teaching of the art in this respect.

The preparation of the catalysts according to the invention can be carried out in several ways. For example, the finely divided elemental antimony, having a grit size of less than 20 microns, can be prepared as disclosed in the U.S. patent application specification No. 784,248. As a starting material, commercial powdered antimony metal can be used, or also metallic antimony as obtained by chemical reduction of Sb compounds as disclosed in the patent specification aforementioned.

Among the titanium compounds, titanium hydride having a grit size of less than 10 microns can be prepared by grinding, in a conventional mill, commercial Ti hydride having a larger size.

Generally, the fine powders as obtained, both for the Sb and the Ti compound, are suitably dispersed in the same glycol to be used in the preparation of the polyester (usually ethylene glycol) and the two dispersions are then combined, individually or upon having been blended together, to the reaction environment which has been selected for the preparation of the polyester concerned.

Another favourable preparation of the inventive catalyst consists in carrying out, through a chemical process, the precipitation of metallic antimony in the form of extremely fine particles on the particles of the insoluble titanium compound, such as titanium hydride. This precipitation is obtained by reducing antimony compounds which have been dissolved in solutions, for example in the presence of powdered titanium hydride dispersed in such a solution. Said precipitation is called "nucleation." The catalyst is separated in the form of a fine powder in a dry condition, and suitable portions theerof are dispersed, in the preferred embodiment, in ethylene glycol, a dispersion being thus obtained which is ready for being used in the preparation of the polyester as outlined above.

In the following, a few nonlimiting examples of the invention will be reported, in which a few favourable embodiments of the inventive method are reported along with a few preferred procedures for the preparation of the catalyst.

EXAMPLE 1

A stainless-steel test reactor for polymerization, having a capacity of 25 liters and equipped with rectification column and a stirrer, is loaded with the following products:

| | Parts |
|---|---|
| Dimethyl terephthalate | 8,000 |
| Monoethylene glycol | 3,300 |
| $Zn(CH_3COO)_2 \cdot 2H_2O$ (re-esterification catalyst) | 1.6 |
| Triethyl phosphate | 1.34 |

A catalyst system for polycondensation, as specified in Table 1 to follow, is dispersed in 2.000 parts of monoethylene glycol.

The reaction mass is gradually brought to a temperature of 220° C. during 6 hours, during which time all the methyl alcohol formed in the ester interchange reaction between dimethyl terephthalate and monoethylene glycol is distilled off.

To the reaction system a progressive vacuum is then applied, which attains in the space of two hours a value of 0.5 mm. Hg of residual pressure, whereas the temperature is raised from 220° C. to 280° C.

Polycondensation is completed by keeping the reactor under a residual pressure of 0.5 mm. Hg at 280° C. until attaining the desired degree of polycondensation (eta) $=0.650\pm0.01$, which is indicated by an appropriate metering instrument which measures the power absorbed by the stirrer.

The polymer is then extruded under pressure of nitrogen in cold water, in the form of filaments which are subsequently severed into granules. The following analyses are carried out on the obtained polymers:

Intrinsic viscosity (eta) in phenol/tetrachloroethane 60/40, at 20° C., concentration 1 gram of polymer in 100 cu. cm. of the solution.

Carboxyl end groupings—COOH per $10^6$ grams of polymer

Diglycol ether groups—DEG percent mols on the terephthalic radicals

Melting point—On plate for microscopical observation

The results of the analyses are reported in Table No. 1.

(1) Finely divided metallic antimony

The metallic antimony is prepared by electrochemical reduction from compounds of trivalent antimony, then dispersed in monoethylene glycol by turbodispersion and homogenization treatments.

(2) Finely divided titanium hydride

Titanium hydride is prepared with a grit size of less than 10 micron by milling in a ball mill (during 120 hours), dispersed, on a weight basis of 25% in monoethylene glycol, under an argon blanket and at room temperature, starting from a product having the composition Ti.1.9H and a grit side of about 60 microns.

Portions of the dispersion thus obtained are dispersed again in monoehtylene glycol, with treatments akin to those of paragraph 1, in the various dosages as will be reported hereinafter.

(3) Metallic antimony and titanium hydride systems

These systems are prepared by dispersing in monoethylene glycol, with turbodispersion and homogenization procedures, various portions (as reported in Table 1) of elemental Sb along with previously prepared dispersions of Ti hydride as outlined above.

The same procedure is adopted when preparing a catalyst system based on metallic antimony and titanium carbide.

TABLE 1
[System based on reduced elemental antimony and titanium hydride]

| | Percent Ti gram atoms per gram atom of total (Sb+Ti) | Duration of the polycondensation in a vacuo of 0.5 mm. Hg hours | (Eta) | (COOH)/ $10^6$ | DEG, percent mol | M.P., °C. |
|---|---|---|---|---|---|---|
| Sb p.p.m. on the polymer: | | | | | | |
| 150 | | $4^{15}$ | 0.651 | 21.5 | 1.55 | 263–265 |
| 300 | | $3^{10}$ | 0.666 | 18 | 1.80 | 263 |
| 340 | | $3^{00}$ | 0.663 | 23 | 1.80 | 265 |
| 450 | | $2^{50}$ | 0.641 | 21 | 1.65 | 265 |
| Titanium hydride calcd. as metal, p.p.m. on the polymer: | | | | | | |
| 25 | | $5^{10}$ | 0.661 | 35.5 | 1.65 | 265 |
| 50 | | $3^{30}$ | 0.648 | 30 | 1.80 | 265 |
| 75 | | $2^{45}$ | 0.659 | 25 | 1.85 | 267 |
| Sb+$TiH_2$ p.p.m. on the polymer: | | | | | | |
| 250 | 8.5 | $2^{40}$ | 0.641 | 25.5 | 1.85 | 263 |
| 365 | 15.7 | $2^{20}$ | 0.665 | 21 | 1.80 | 265 |
| 390 | 27.2 | $2^{05}$ | 0.651 | 27 | 1.85 | 263 |
| 650 | 17.5 | 1.80 | 0.67 | 25 | 1.8 | 262 |

A test performed by using metallic antimony and titanium carbide as the catalyst has given the following results:

| Sb+Ti p.p.m. on the polymer | Percent Ti gram atoms per total gram atoms of Sb+Ti | Duration of polycondens. in a vacuo of 0.5 mm. Hg hours | (Eta) | (COOH)/ 10⁶ | DEG, percent mol | M.P., °C. |
|---|---|---|---|---|---|---|
| 365 | 15.7 | 2.50 | 0.64 | 20 | 1.8 | 262 |

EXAMPLE 2

A stainless steel polymerization test reactor having a capacity of 25 liters and equipped with rectification column and stirrer is loaded with the same starting materials as in Example 1, together with a catalyst system for polycondensation, as dispersed in 2,000 parts of monoethylene glycol, as described in the Table 2 to follow.

The reaction mass is gradually brought to a temperature of 220° C. during a time of 6 hours approximately and the remainder of the process run is carried out according to the procedure which has already been indicated for Example 1.

The results of the analyses and the duration of polycondensation in a vacuo of 0.5 mm. Hg are tabulated in Table 2.

Nucleated metallic/antimony over titanium hydride

The reduction of the compounds of trivalent antimony is carried out in an acidic aqueous solution and in the presence of titanium hydride in extremely fine, sub-micron particles obtained with conventional grinding procedures.

The metallic antimony being formed during the reduction reaction, precipitates in the form of finest particles over the titanium hydride particles present in the reaction environment, being nucleated thereover. Under the most desirable working conditions, the concentration by weight of $TiH_2$ with respect to the reaction medium is comprised between 0.5 and 5 per thousand, whereas the concentration with respect to the catalyst system of reduced Sb $TiH_2$ is comprised between 0.5 and 25 percent. The mixed catalyst is isolated in the form of a dry, fine powder. Suitable amounts thereof are then dispersed with the customary procedure in monoethylene glycol, a dispersion being obtained which is adapted to be used as polycondensation catalyst.

In general, and on the basis of many tests which have been carried out, it has been noticed that the results obtained with the use of these systems of Sb nucleated over Ti hydride, and precisely the duration of the polycondensation and the color of the polymer, are extremely satisfactory: in addition these results are uniformly duplicated when tests are performed by maintaining the working conditions constant.

TABLE 2
[Systems based on Sb nucleated over Ti hydride]

| Sb+TiH₂ p.p.m. on the polymer | Percent Ti gram atoms per total gram atoms of Sb+Ti | Duration of polycond. hours * | (Eta) | (COOH)/ 10⁶ | DEG, mol percent | M.P. °C. |
|---|---|---|---|---|---|---|
| 300 | 12 | 2.35 | 0.651 | 21 | 1.75 | 262 |
| 350 | 12 | 2.20 | 0.644 | 23.5 | 1.90 | 262 |
| 200 | 23.3 | 2.20 | 0.643 | 21.5 | 1.75 | 263 |
| 300 | 23.3 | 2.05 | 0.651 | 28 | 1.80 | 262 |
| 340 | 23.3 | 2.00 | 0.666 | 24.5 | 1.80 | 262 |
| 100 | 38 | 2.10 | 0.65 | 29 | 2.1 | 263 |

* In a vacuo of 0.5 mm. Hg.

What we claim is:

1. A method for producing a fiber-forming polyalkylene terephthalate comprising polycondensing a starting material selected from the group consisting of dimethyl terephthalate re-esterified with monoethylene glycol and terephthalic acid esterified with monoethylene glycol, using a polycondensation catalyst system consisting of a dispersion in monoethylene glycol of metallic antimony in particulate form and an insoluble titanium compound in particulate form selected from the group consisting of $TiH_2$ and titanium carbide, the metallic antimony particles having a size of less than 20 microns, the particles of the insoluble titanium compound being present in the catalyst system in amounts ranging from 1 to 45 percent and having an individual size less than 10 microns, and the amount of the catalyst system employed being between 40 and 800 parts per million by weight of the metal with respect to the polymer to be produced.

2. A method according to claim 1, wherein the insoluble titanium compound is titanium hydride.

3. A method accordinng to claim 1, wherein the catalyst system consists of metallic antimony which has been nucleated over particles of the insoluble titanium compound.

References Cited

UNITED STATES PATENTS 3,053,810  9/1962  Griehl et al. _____ 260—75

FOREIGN PATENTS 740,381  11/1955  Great Britain _____ 260—75

OTHER REFERENCES

Pascal: Nouveau Traité de Chemie Minérale, Tome IX, published 1963, Masson et Cie, Paris, France, pp. 114, 145 and 168–174.

MELVIN GOLDSTEIN, Primary Examiner

U.S. Cl. X.R.

252—430